US012162192B2

(12) United States Patent
Aguire et al.

(10) Patent No.: US 12,162,192 B2
(45) Date of Patent: Dec. 10, 2024

(54) DIRECTIONAL AIR KNIFE

(71) Applicant: Inteplast Group Corporation, Livingston, NJ (US)

(72) Inventors: Joseph Aguire, Simpsonville, SC (US); Jiangshan Sun, Simpsonville, SC (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 108 days.

(21) Appl. No.: 17/846,611

(22) Filed: Jun. 22, 2022

(65) Prior Publication Data
US 2023/0415384 A1   Dec. 28, 2023

(51) Int. Cl.
*F26B 21/00* (2006.01)
*B29C 41/26* (2006.01)
*B29C 41/34* (2006.01)

(52) U.S. Cl.
CPC .............. *B29C 41/34* (2013.01); *B29C 41/26* (2013.01); *F26B 21/004* (2013.01)

(58) Field of Classification Search
CPC .................................................... F26B 21/004
See application file for complete search history.

(56) References Cited

U.S. PATENT DOCUMENTS

| 6,990,751 B2 | 1/2006 | Riley et al. |
| 9,480,282 B2 | 11/2016 | Levy |
| 9,557,108 B2 | 1/2017 | Freers et al. |

FOREIGN PATENT DOCUMENTS

CN   208643522   *   3/2019

OTHER PUBLICATIONS

CN208643522 machine translation (Year: 2019).*
Skew definition (Year: 2024).*

* cited by examiner

*Primary Examiner* — S. Behrooz Ghorishi
*Assistant Examiner* — Alexander A Wang
(74) *Attorney, Agent, or Firm* — Stinson LLP

(57) ABSTRACT

A directional air knife, components thereof, and associated methods. The air knife includes a housing that comprises an inlet opening which receives air under pressure into the housing along a first inlet axis. A chamber is defined within the housing and positioned to receive air that passes through the inlet opening along the first inlet axis. A discharge duct is defined by the housing and includes a discharge channel within the discharge duct. The discharge channel is in fluid communication with the chamber which receives the air under pressure. The housing defines an outlet opening through which the air under pressure passes out of the discharge duct. The discharge channel has a second central axis along which the air under pressure flows to the outlet opening and out of the housing. The second central axis is arranged with respect to the first inlet axis at a skew angle.

20 Claims, 22 Drawing Sheets

DIRECTIONAL AIR KNIFE

FIELD

The present disclosure generally relates to manufacturing a plastic film.

BACKGROUND

Air knives are well known for use in many manufacturing and other contexts. In particular, it is known to employ an air knife that directs a focused column of air against an edge of the web of film being formed from molten polymeric film to hold the film in position on a chill roll while it solidifies. However, in some instances the air flow may not be ideally directed. Air applied directly to the chill roll next to the edge of the polymeric film can easily pass under the film, causing it to lift up and tear. However, altering the position of the air knife to avoid this can cause a reduction in air pressure being applied to the edge of the polymeric file so that it is inadequate to hold the edge against the chill roll.

SUMMARY

In one aspect, a directional air knife usable in plastic film production applies pressurized air to an edge of a film as the film is being formed. The directional air knife comprises a housing that includes an inlet opening. The inlet opening receives pressurized air along a first inlet axis. A chamber is defined by the housing and positioned to receive the pressurized air passing through the inlet opening along the first inlet axis. A discharge duct defined by the housing and includes a discharge channel. The discharge channel is in fluid communication with the chamber and receives the pressurized air. The discharge channel has a second central axis arranged with respect to the first inlet axis at a skew angle.

In another aspect, a directional air knife usable in plastic film production applies pressurized air to an edge of a film as the film is being formed. The directional air knife comprises a housing that includes an inlet opening. The inlet opening receives pressurized air along a first inlet axis. A chamber is defined by the housing and positioned to receive the pressurized air passing through the inlet opening along the first inlet axis. A discharge duct defined by the housing and includes a discharge channel. The discharge channel is in fluid communication with the chamber and receives the pressurized air. The discharge channel has a second central axis arranged with respect to the first inlet axis at a skew angle. The housing includes an inlet portion that has laterally opposite end surfaces which in part contain the chamber. The discharge duct extends outward from the inlet portion such that the discharge duct projects laterally outward from a projection of one of the opposing end surfaces of the inlet portion of the housing.

In yet another aspect, an apparatus for making a film comprises a container that holds a quantity of polymeric material heated to be in a liquid state. A die in fluid communication with the container receives polymeric material from the container and extrudes the polymeric material into a thin and flat web which exits the die. A chill roll adjacent to the die receives the web exiting the die. The chill roll is cooled to a temperature that promotes transition of the polymeric material in the web to a more solid state in which the web of material is capable of retaining its shape under the force of gravity. The chill roll is mounted for rotation in an operating direction. An air knife located adjacent to the chill roll and configured with respect to the chill roll directs an elongate flow of air from the air knife along a discharge axis onto the web on the chill roll. The air knife is arranged with respect to the chill roll so that at the location where air exiting the air knife along the discharge axis impinges upon the chill roll, a component of the motion of the air resolved to be tangent to a surface of the chill roll at the impingement location is in the same direction as the operating direction in which the chill roll rotates.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
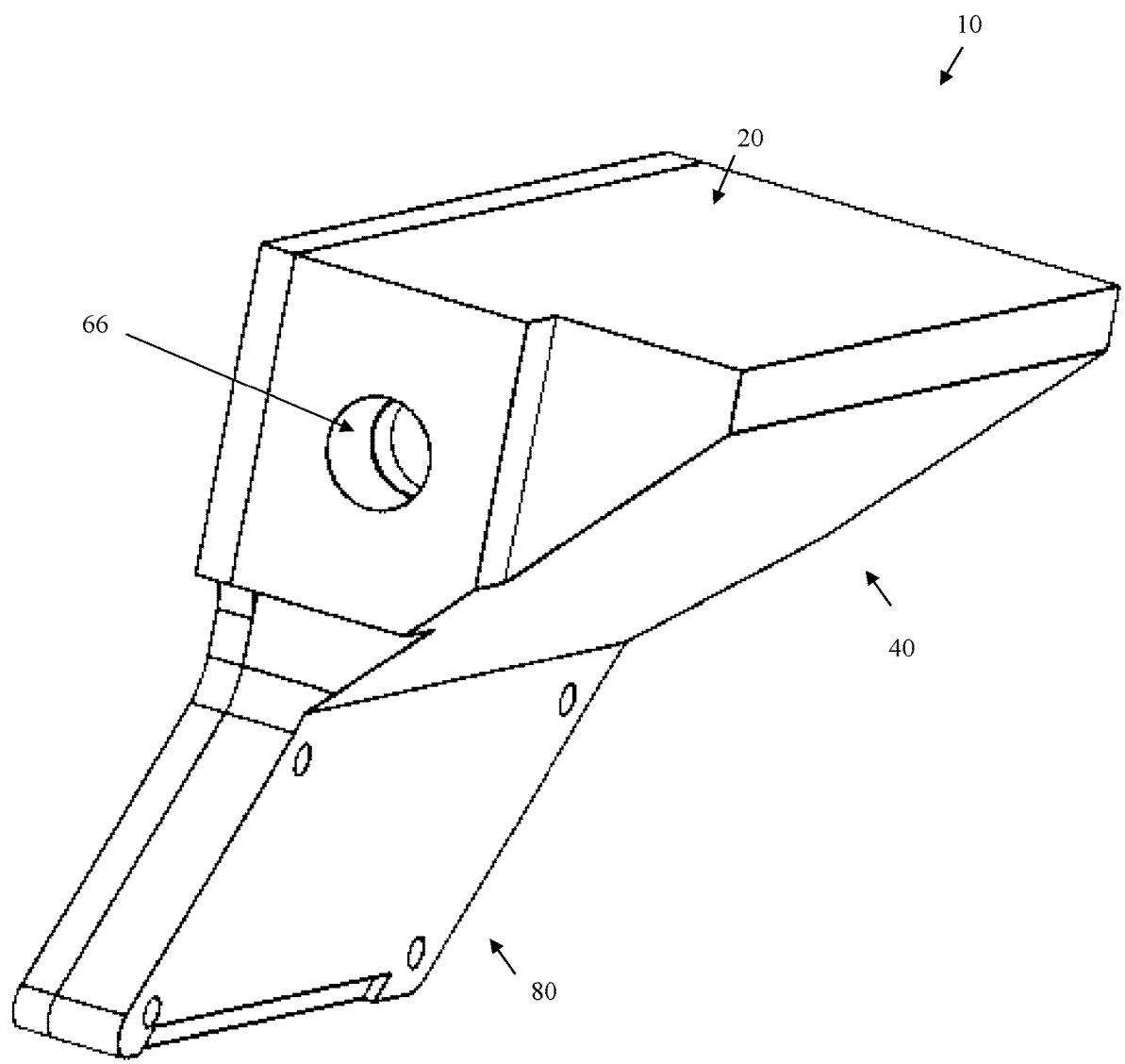
FIG. 1 is a perspective of an air knife of the apparatus.
Figure 1A:
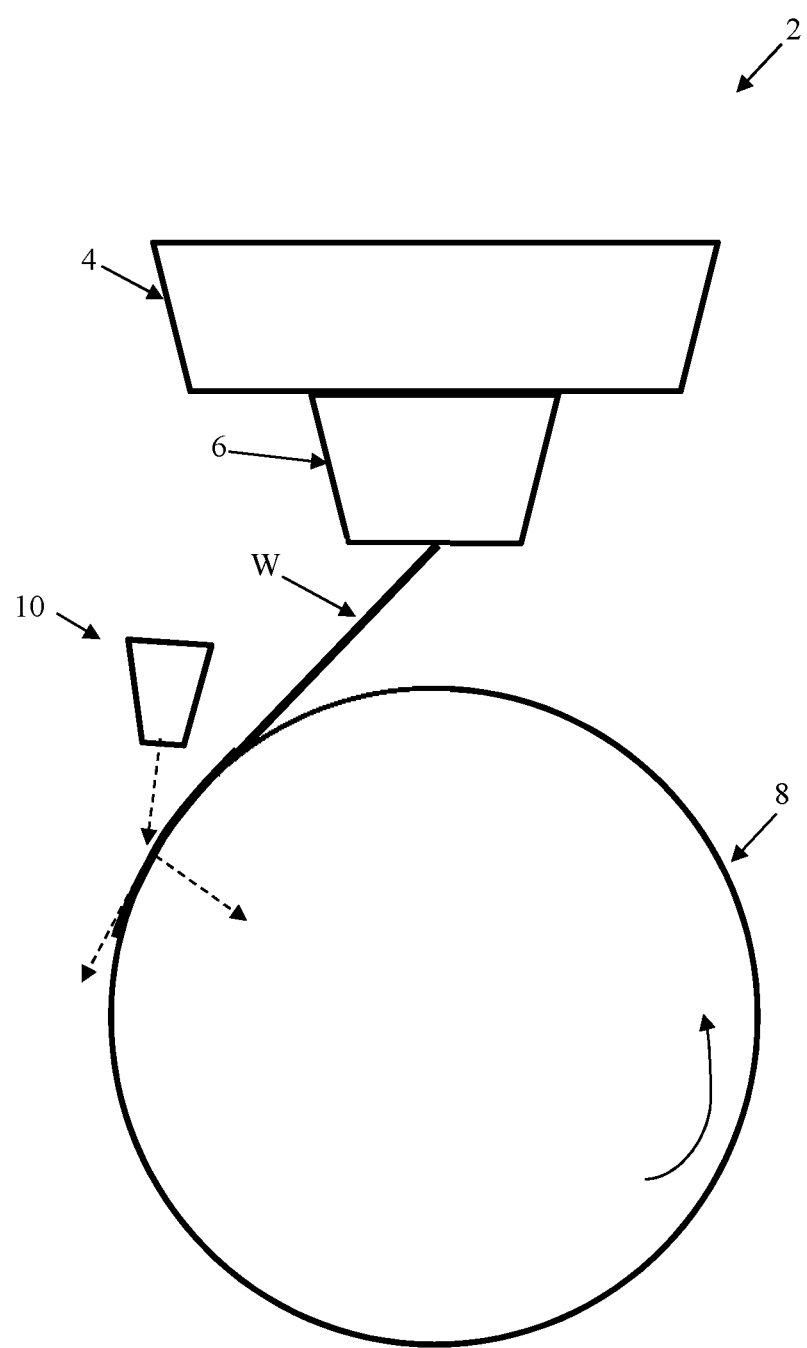
FIG. 1A is a schematic of an apparatus for forming a polymeric film.

Referring to FIG. 1A, apparatus 2 for forming a film is shown to comprise a container 4 capable of carrying a quantity of melted polymeric material in a liquid or flowable state. A die 6 is positioned to receiving the polymeric material from the container and to extrude the polymeric material into a thin, flat web W. The web leaves the die 6 and passes onto the rotating surface of a chill roll 8, which is cooled to facilitate a rapid solidification of the polymeric material into the film which will hold its shape under the force of gravity, but also in use in a variety of applications known to those of ordinary skill in the art. A directional air knife of the apparatus is indicated generally at 10. The directional air knife is typically manufactured out of a metal or other suitable material. The directional air knife 10 is used in the apparatus to direct a thin, flat column of pressurized air onto an edge portion of the heated/formable web of film being extruded from the container onto the chilled surface of the rotatable chill roll. The elongate column of pressurized air exits the air knife at a predetermined angle such that the same pressure is applied across the entire edge portion of the web. Thus, air is directed at the edge and away from the edge at an angle making it highly unlikely for any air to flow under the edge of the web W (see, FIG. 23). However, the air column exits the air knife at a constant spacing from the web W and chill roll 8. Thus, there is no substantial variation of pressure applied to the edge margin of the web W.

Referring to FIGS. 1-5, the directional air knife 10 includes a housing 20 having an inlet portion 40 and a discharge duct 80. An interior of the inlet portion 40 defines a chamber 42, which is in fluid communication with a discharge channel 82, defined by an interior of the discharge duct 80. The housing 20 defines an inlet opening 66 having a (first) inlet axis (IA). Pressurized air from a source of pressurized air (not shown) can be delivered into the chamber 42 through the inlet opening 66 along the inlet axis IA. The air then moves from the chamber 42 into the discharge channel 82. The discharge channel 82 has a (second) central axis (CA) that is at a generally skew angle relative to the inlet axis IA. The discharge channel 82 includes an outlet opening 84 configured to emit the pressurized air from the discharge channel 82 in a thin, flat column. It will be understood that an outlet opening may have other configurations, including without limitation emitting the pressurize air in multiple distinct columns.

Figure 2:
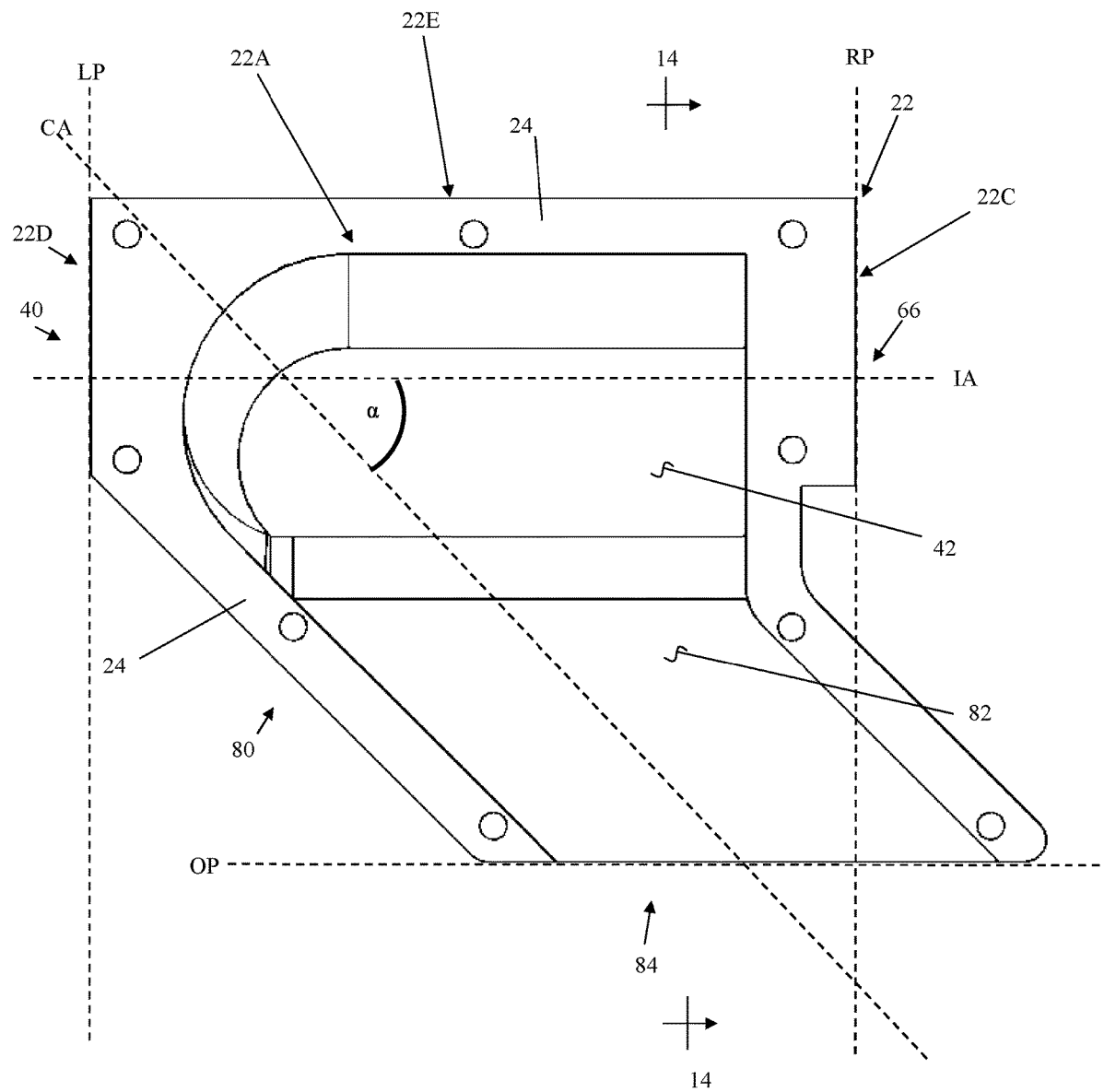
FIG. 2 is a front elevation of the air knife with parts of a housing of the air knife removed to show internal construction.
Figure 3:
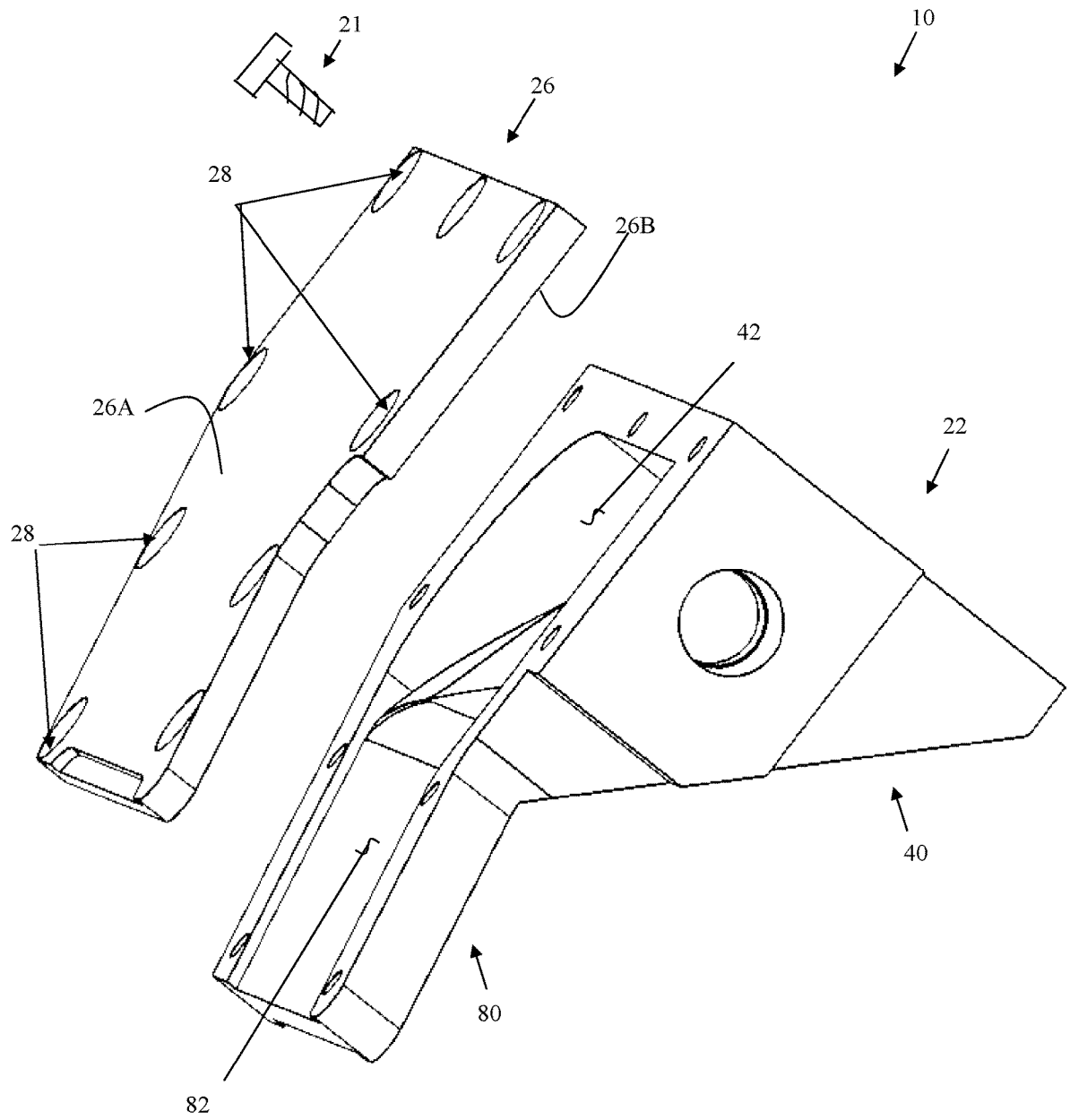
FIG. 3 is an exploded perspective of the air knife.
Figure 4:
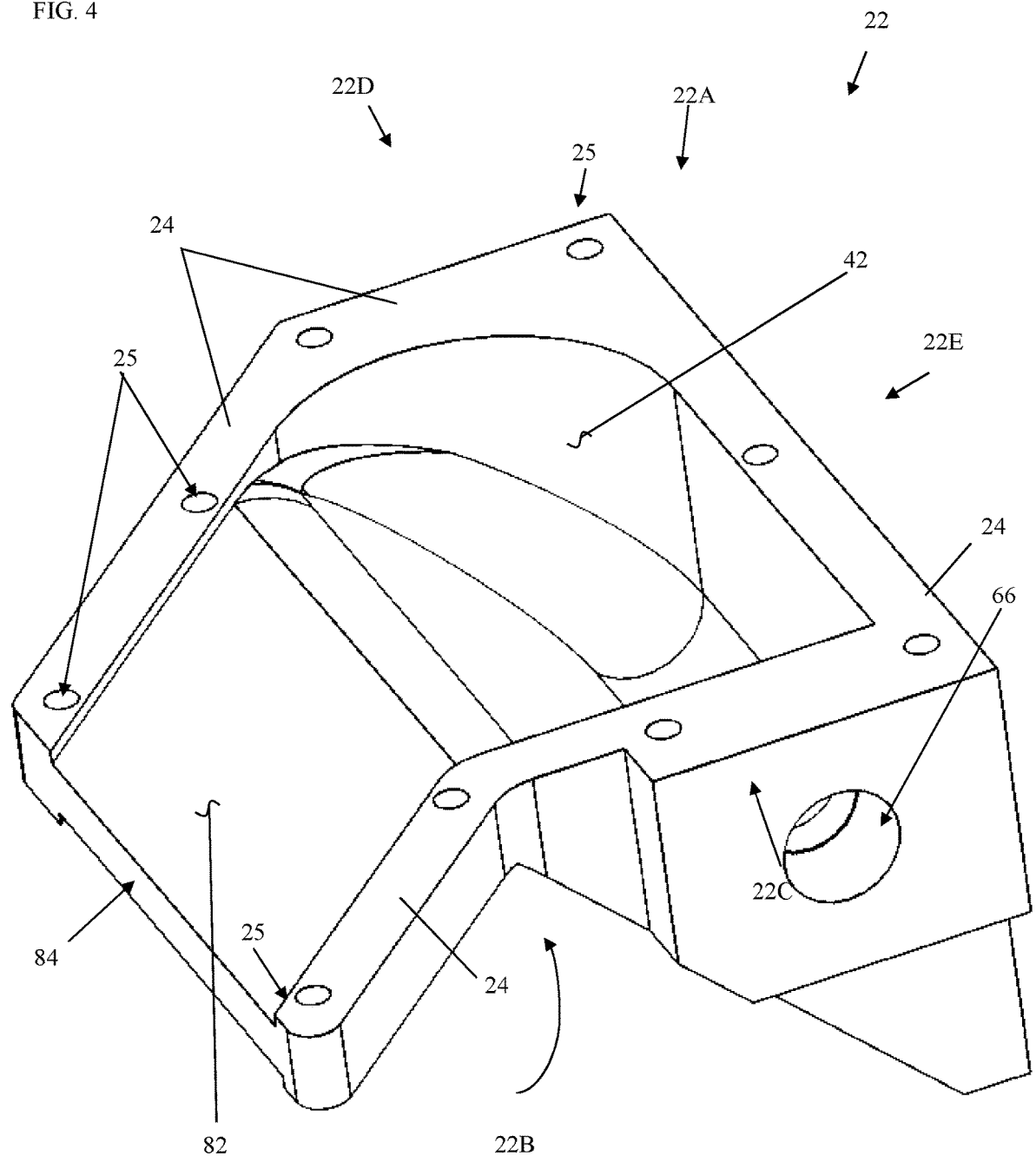
FIG. 4 is a right side perspective of a first housing portion of the housing.

In the illustrated embodiment, an angle α between the inlet axis IA with respect to the central axis CA is about 45-degrees. It will be appreciated that an outlet plane (OP) is parallel with the inlet axis IA. (FIG. 2). Such configuration allows in part for the elongate stream of air to impinge upon the edge portion of the web. As will be discussed in further detail below, the angle α may vary (e.g. 30-degrees, 60-degrees, 90-degrees) however, the outlet plane OP will change in accordance with a change of angle α such that the outlet plane remains parallel with the inlet axis IA.

A housing shell portion 22 ("a first housing portion") and a housing cover portion 26 ("a second housing portion") together form the housing 20. The housing shell portion 22 includes a front side 22A, a rear side 22B opposite the front side, a right side 22C, a left side 22D, and an upper side 22E. The front side 22A of the shell portion includes a generally flat (planar) front face margin 24 defining a plurality of openings 25 around the right, left, and upper sides, 22C, 22D, 22E, respectively.

The housing cover portion 26 is generally flat, and sized and shaped to cover the front side 22A of the shell portion. The housing cover portion 26 includes a plurality of openings 28 located at an edge margin of the cover portion 26 arranged to correspond with the plurality of openings of shell portion 25. The cover portion 26 includes an exterior face 26A and an opposite interior face 26B. When the shell portion 22 and cover portion 26 are fastened together, the interior face 26B faces inward toward the chamber 42 and discharge channel 82. The shell portion 22 and cover portion 26 cooperate to form the chamber 42 and discharge channel 82. Fasteners (e.g. screws, bolts, etc.) shown schematically at 21 in FIG. 3 may be received through the openings 25, 28 of the shell portion 22 and cover portion 26 for fastening the cover portion and the shell portion together to form the housing 20. A gasket (not shown) may be provided at the connection joint of the cover portion 26 and the shell portion 22 to prohibit and/or mitigate air from inadvertently escaping the housing at locations other than the outlet opening 84. Other configurations (e.g. a unitary housing) are within the scope of this disclosure.

Referring to FIG. 2, shown schematically, dashed lines labeled (RP) for right projection and (LP) for left projection, represent a projection of a plane of the right side 22C and of the left side 22D of the housing 20, respectively. As shown, the inlet axis IA of the housing 20 is generally substantially perpendicular with the right plane while intersecting the channel axis CA of the discharge duct 80 at angle α. In the illustrated embodiment, because of the angle α, the right projection RP intersects a portion of the discharge duct 80, whereas the left projection LP is free from intersecting any part of the discharge duct. As will become apparent, such configuration of the channel axis CA of the discharge duct 80 with respect to the inlet axis IA of the housing 20 allows, in part, for the edge portion of the web to receive equal air pressure.

Figure 5:
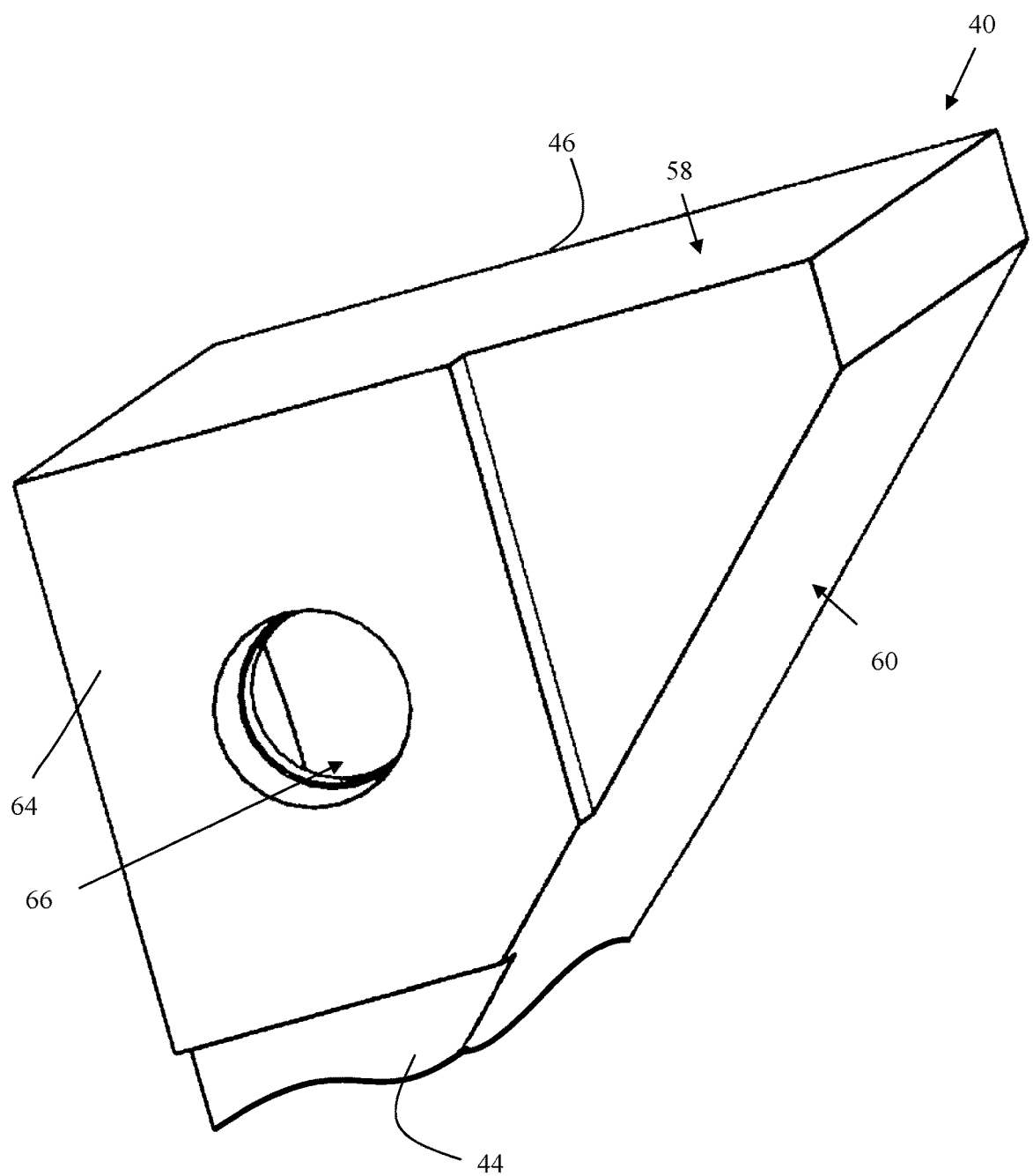
FIG. 5 is an enlarged, fragmentary perspective of an inlet portion of the first housing portion.
Figure 6:
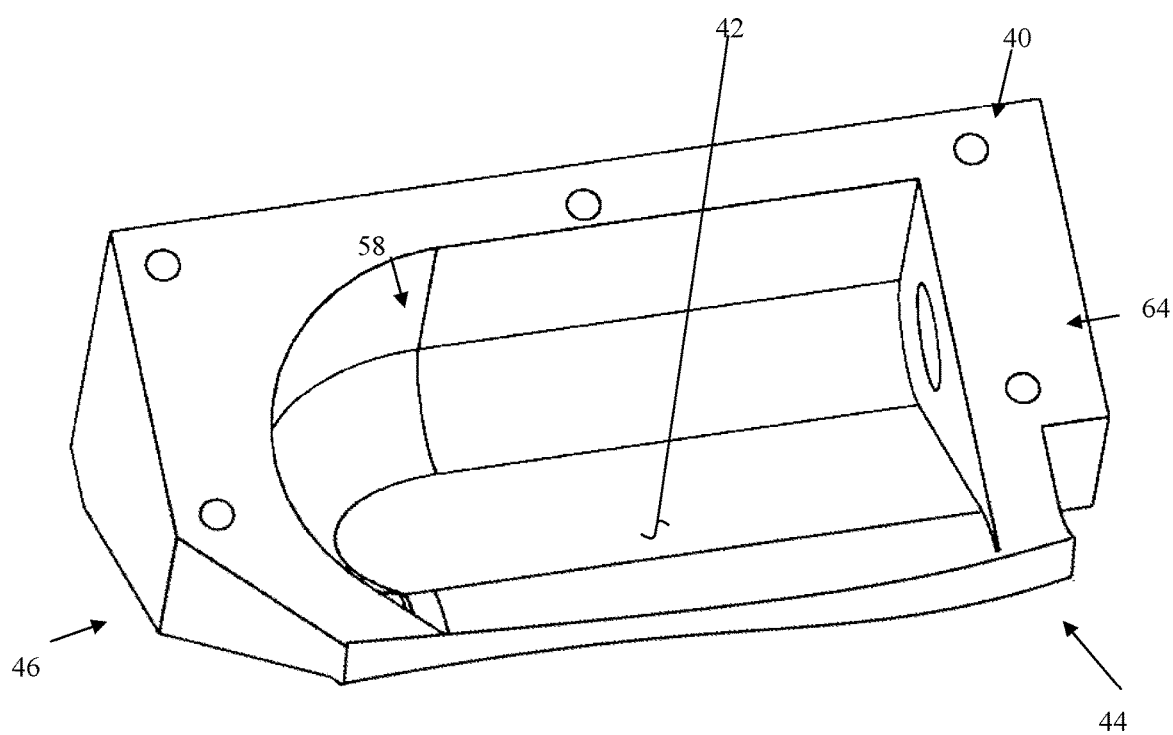
FIG. 6 is a front perspective of FIG. 5.

Referring to FIGS. 5 and 6, a section of the housing schematically illustrates the inlet portion 40 of the housing. In the illustrated embodiment, the inlet portion 40 has a plurality of walls, including a right (first) end wall 44, a left (second) end wall 46 opposite the right end wall, an upper (third) side wall 58 extending between the right and left end walls, and a lower (fourth) side wall 60 angled from an end portion of the upper side wall to an edge portion of each of the right and left end walls. In the illustrated embodiment, the right end wall 44 includes an inlet block 64 protruding from the remainder of end wall 44 and defining the inlet opening 66. In one embodiment, the exterior face of the upper side wall has a length of about 69 mm (2.72 inches) and a width of about 36 mm (1.42 inches).

Referring to FIGS. 7-10, the discharge duct 80 is roughly a parallelogram formed from a plurality of walls. The plurality of walls includes a right (first) side wall 86, a substantially parallel and opposite left (second) side wall 88, and a substantially planar (third) wall 90 extending between the left and right walls. The cover portion 26 forms the other wall of the discharge duct 80. A transition surface 68 (FIG. 10) forms a transition from the chamber 42 to the discharge channel 82 along a side of the chamber. In one embodiment, the transition surface 68 is curved, having a radius of about 8 mm (0.32 inches). The curved transition surface 68 facilitates the flow of pressurized air from the chamber 42 into the discharge channel 82. Transition surfaces having other shapes (e.g. flat) can be used without departing from the scope of the present disclosure. In the illustrated embodiment, the center of the curved transition surface 68 is generally offset by a distance O from the inlet axis IA. Other configurations (e.g. moving the inlet opening to a different side of the housing) are possible without departing from the scope of this disclosure.

Figure 11:
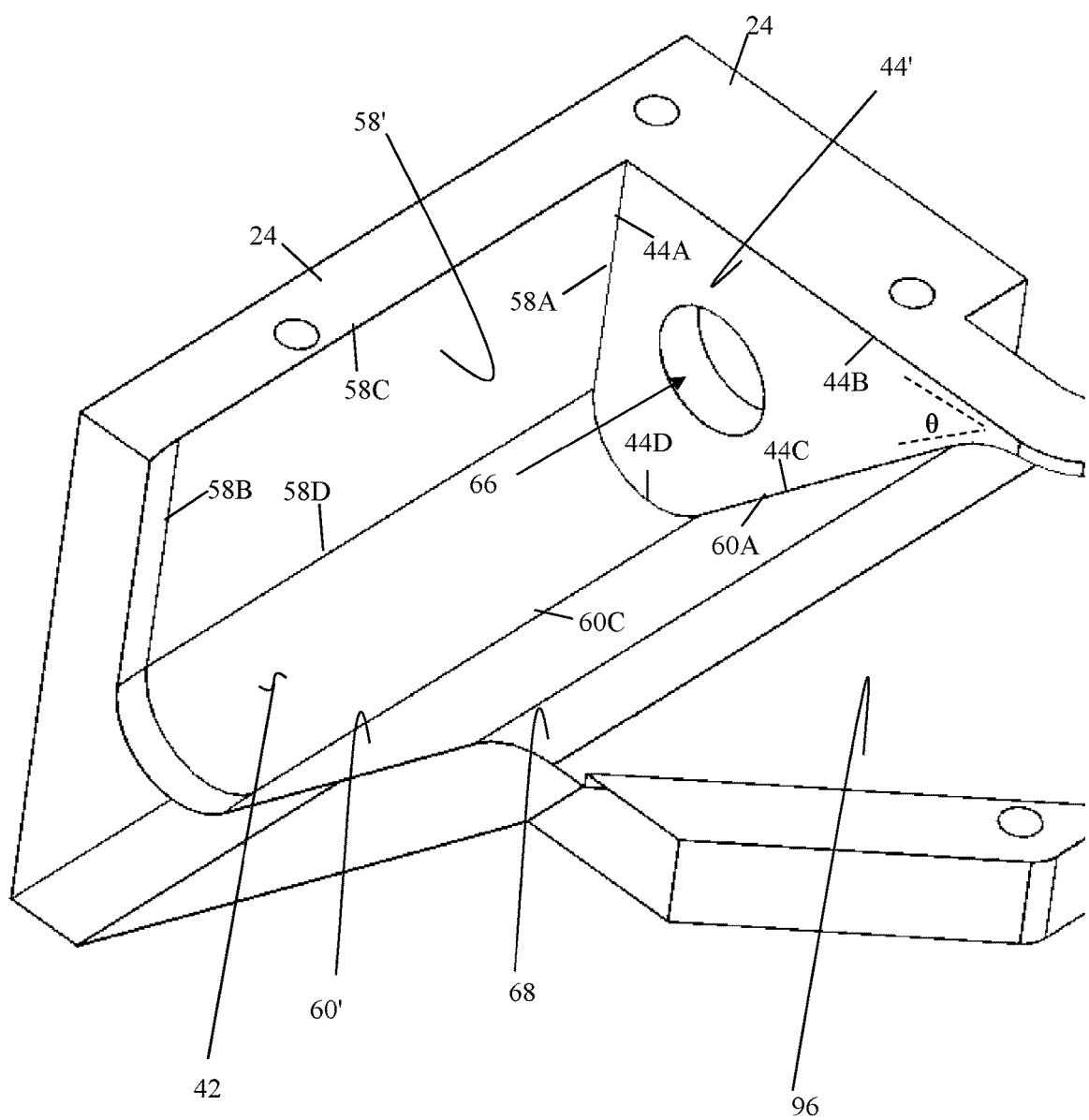
FIG. 11 is a left side, fragmentary perspective of the first housing portion.
Figure 12:
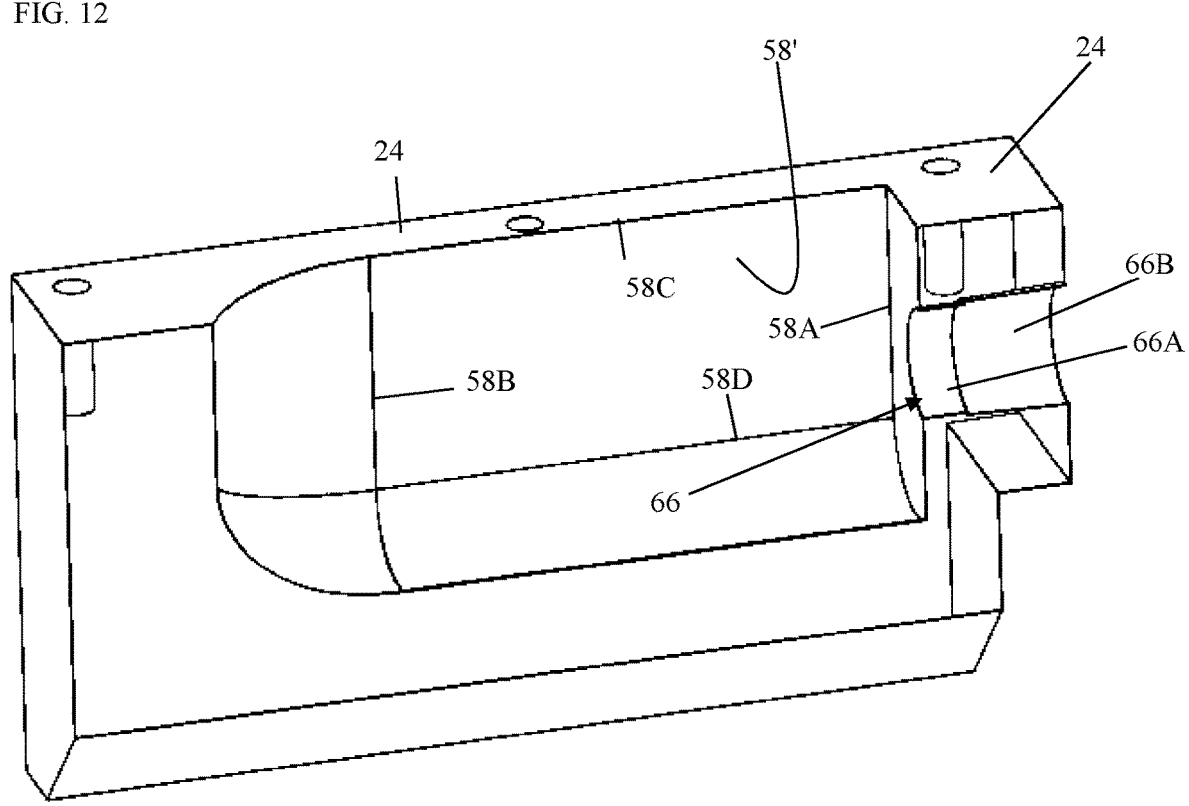
FIG. 12 is a front perspective in section taken in a plane including line 12-12 of FIG. 10.
Figure 13:
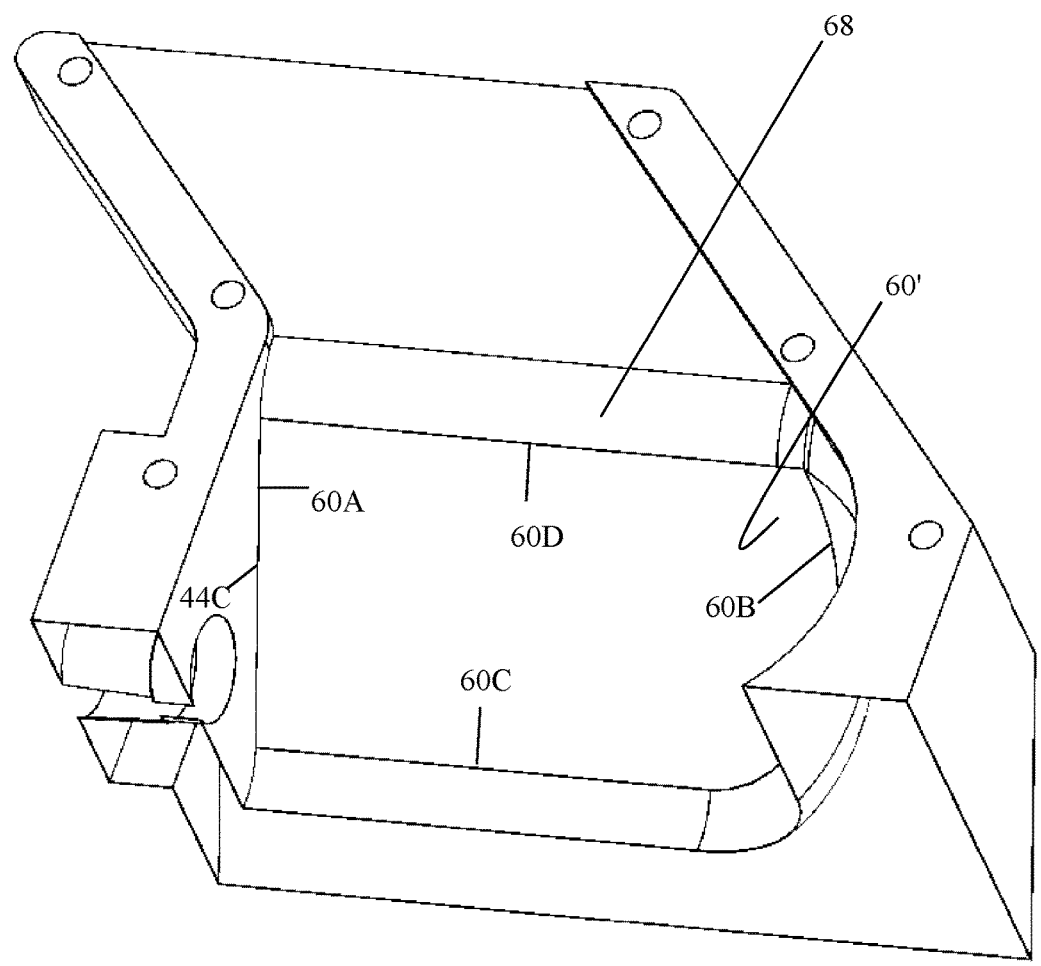
FIG. 13 is a top perspective of the first housing shell portion with a top wall broken away.
Figure 14:
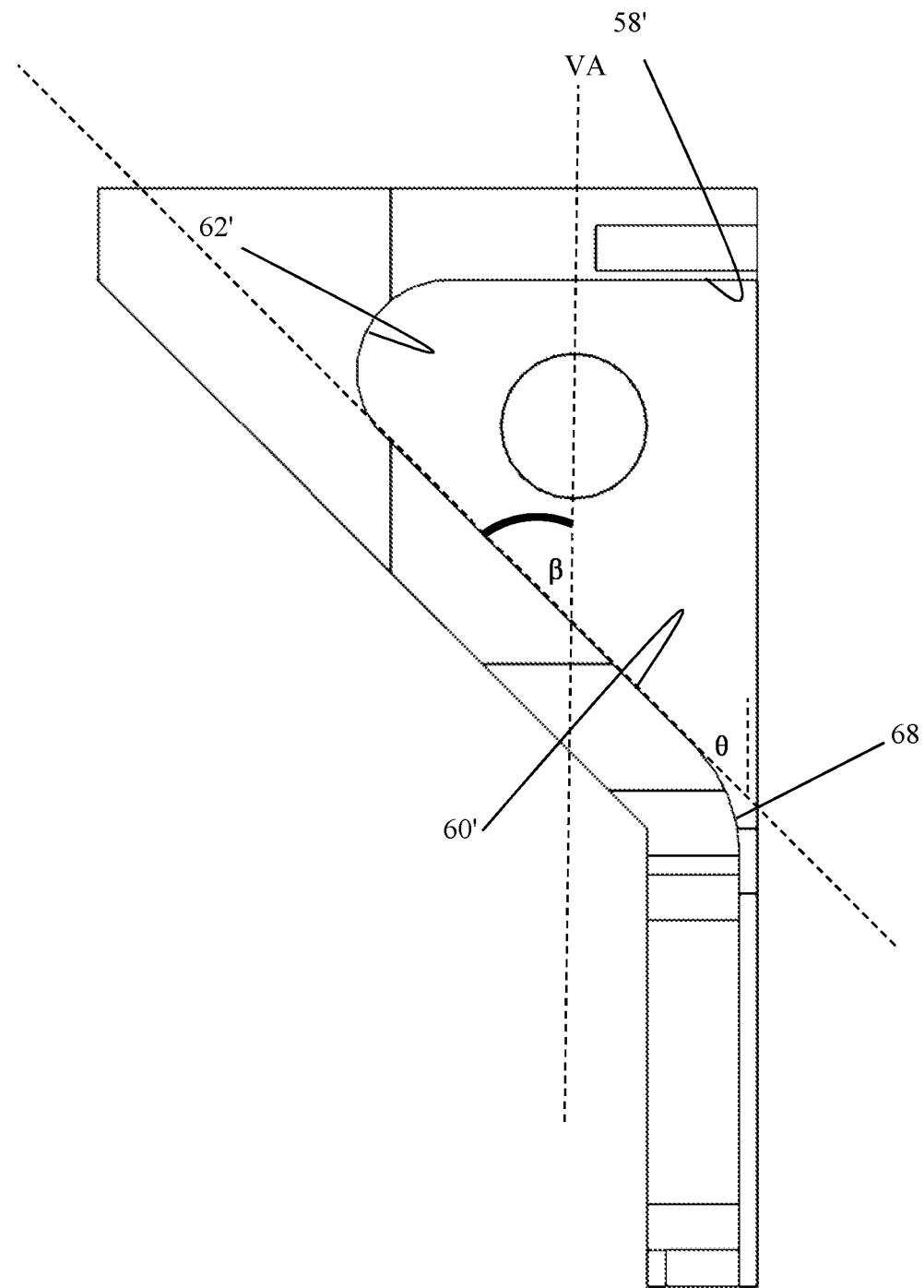
FIG. 14 is a section of the first housing portion taken in the plane including line 14-14 of FIG. 2.

Referring to FIGS. 11 and 12, the surfaces that form the chamber 42 including the interior face 44' of the right end wall, the interior face 58' of the upper side wall, and the interior face 60' of the lower wall. The interior face 44' of the right end wall is roughly triangularly shaped, having a first edge segment 44A of about 17 mm (0.67 inches), a second edge segment 44B of about 35 mm (1.34 inches), and a third edge segment 44C of about 43 mm (1.70 inches). An angle θ of about a 45-degrees is formed between the second edge segment 44B and the third edge segment 44C. A rounded edge segment 44D having a radius of about 5 mm is formed between the first edge segment 44A and the third edge segment 44C. The inlet opening 66 passes through the interior face 44', near a center portion of the face. The inlet opening 66 includes an inner collar 66A and an outer collar 66B. The outer collar 66B tapers from a first radius of about 4.35 mm (0.17 inches) to a second radius of about 4 mm (0.16 inches). The second radius is shared with the inner collar 66A. The inner collar has a radius of about 4 mm (0.16 inches), and opens into the chamber 42. The length of the opening 66 is about 10 mm (0.39 inches). The dimensions given throughout this description are exemplary only and could be other than described without departing from the scope of the present invention. The interior face 58' of the upper wall is a planar rectangular shape including a right edge 58A and a left edge 58B having the same lengths. Similarly, the interior face has an upper edge 58C and a lower edge 58D having the same lengths. The right edge 58A and first leg 44A meet to form a 90-degree corner of the chamber.

Referring to FIGS. 11-14, the interior face 60' of the lower wall is generally arranged on the opposite side of the chamber from the interior face 58' of the upper wall. The interior face 60' is not parallel to the interior face 58', but rather angles toward the discharge channel 82 of the discharge duct 80. More specifically the interior face 60' is a smooth extension of a trough 62'. Similarly, the interior face 60' merges smoothly into the transition surface 68. The interior face 60' of the of the lower wall has a roughly rectangular shape, including a right side edge 60A having a length of about 24 mm (0.94 inches), a curved left edge 60B having an arc length of about 30 mm (1.18 inches) and an increasing radius from about 30 to 40 mm (1.18-1.57 inches) (FIG. 17), a lower edge 60C of about 36 mm (1.42 inches), and an upper edge 60D of about 41 mm (1.6 inches) opposite the lower edge. The right side edge 60A of the interior face 60' of the lower wall and the third leg 44C of the right end wall meet to form a second corner of the chamber. The lower wall 60' is angled forward an angle β relative to a vertical axis (VA) extending through the inlet opening. In the illustrated embodiment, angle β and angle θ are each about 45-degrees. The arrangement of the interior faces 58', 60', trough 62' and transition surface 68 facilitate transitioning the pressurized air from the chamber to the discharge channel 82, as will be explained in further detail below. Other angles may be used without departing from the scope of this disclosure.

Figure 15:
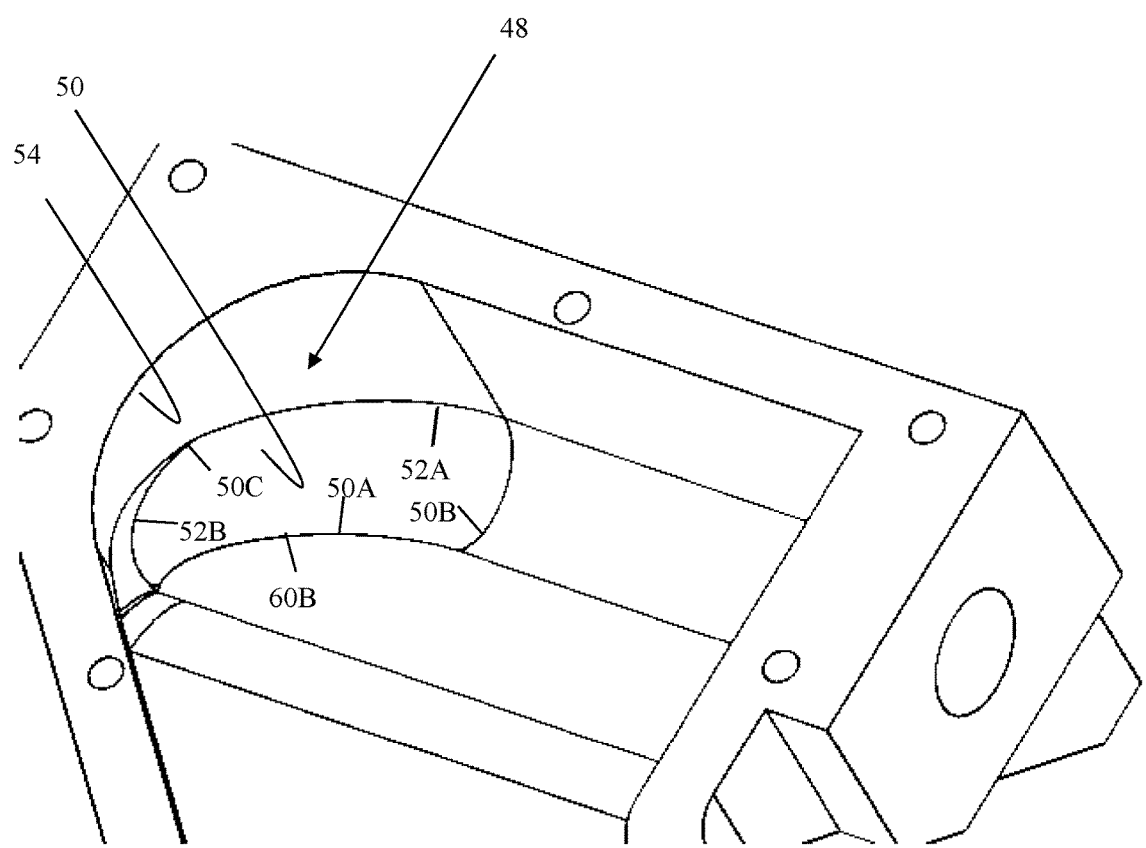
FIG. 15 is an enlarged, fragmentary perspective of the inlet portion of the first housing portion.
Figure 16:
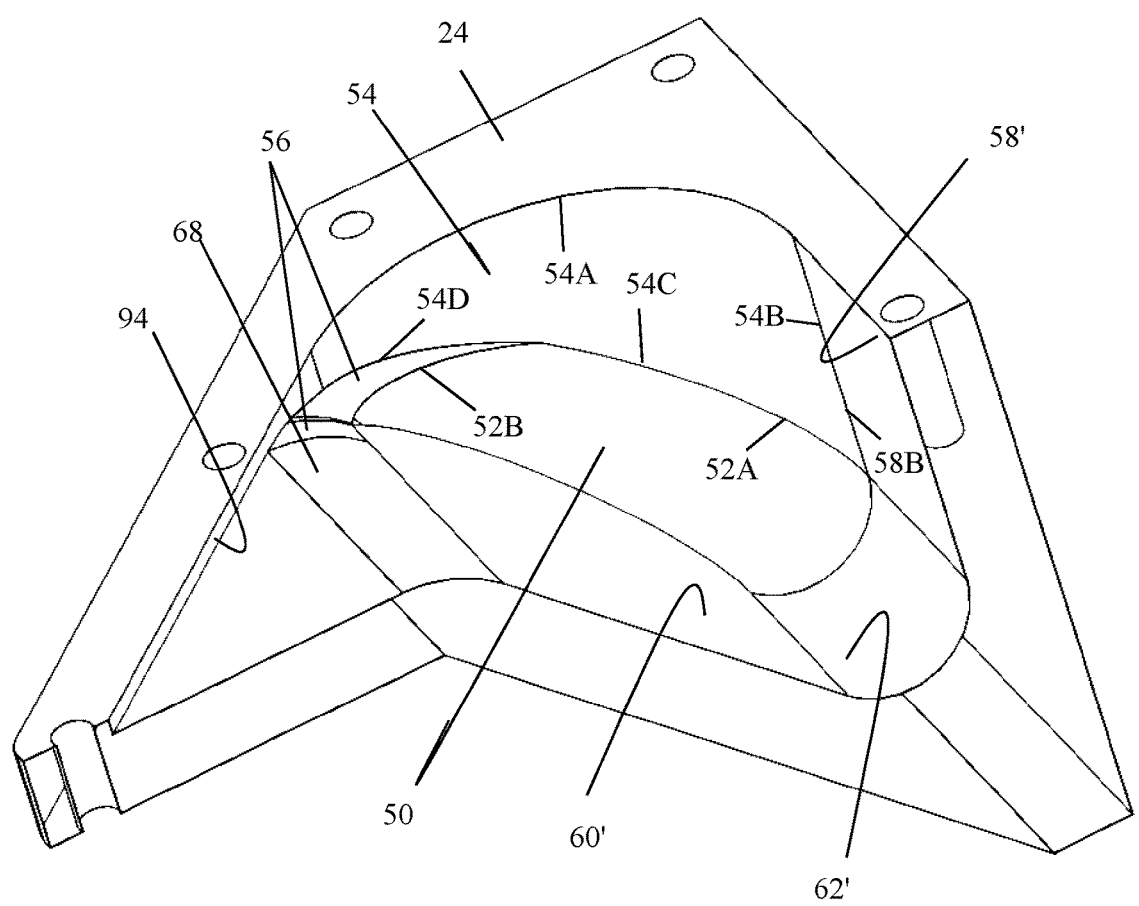
FIG. 16 is a further enlarged fragment of FIG. 15.
Figure 17:
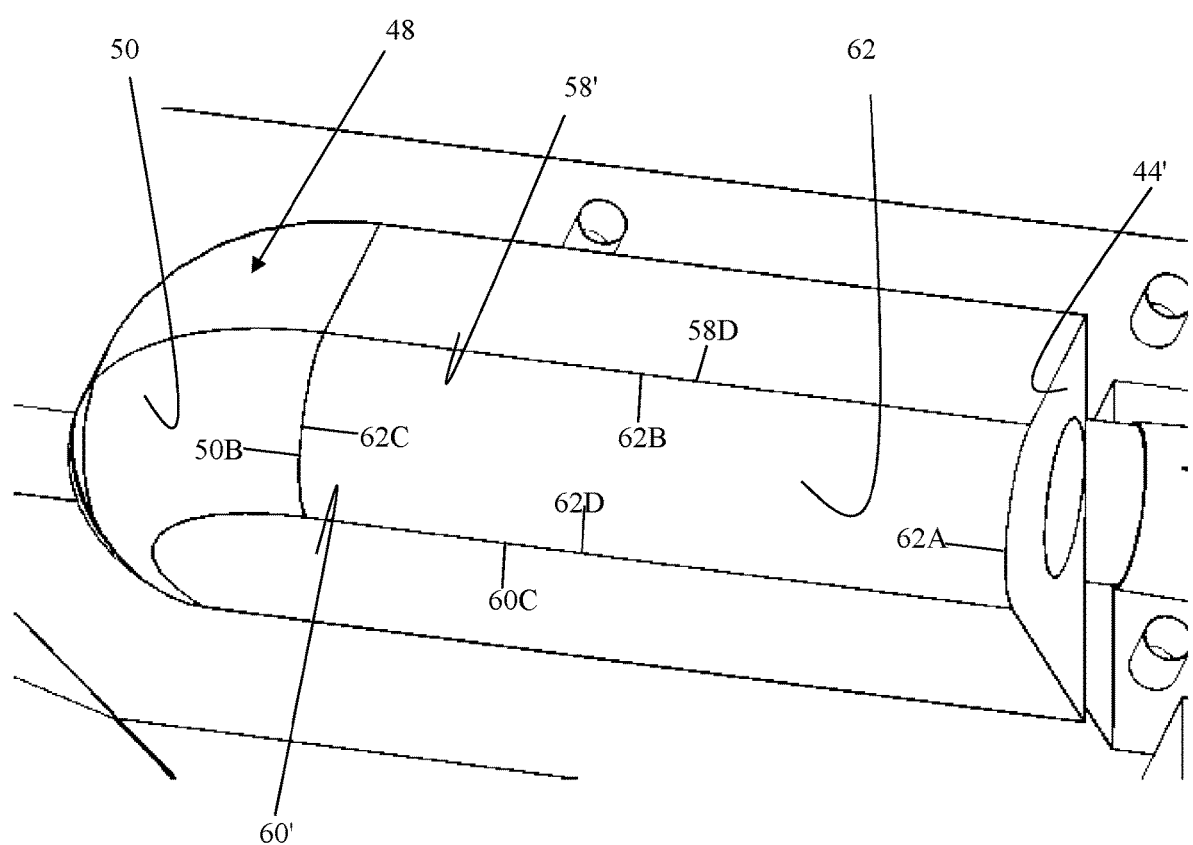
FIG. 17 is an enlarged, fragmentary top perspective of the inlet portion of the first housing portion.

Referring to FIGS. 15 and 16 the interior side of the left end wall includes a lower (first) rounded wall portion 50 and an upper (second) rounded wall portion 54 that adjoin to form a rounded wall 48. The lower rounded wall portion 50 includes a first edge 50A, a second edge 50B, and a third edge 50C. The first edge 50A is generally curved having an arc length of about 30 mm (1.18 inches). The first edge 50A adjoins with the curved left edge 60B of the lower wall. The second edge 50B has a radius of about 5 mm (0.20 inches). The third edge 50C includes a first segment 52A having a radius of about 16 mm (0.63 inches) and a second segment 52B having a radius of about 18 mm (0.71 inches). Referring to FIGS. 15-17, the upper rounded wall portion 54 includes a first edge 54A, a second edge 54B, and a third edge 54C. The first edge 54A has a radius of about 15 mm (0.59 inches) and forms a corner with the front side margin 24. The second edge 54B has a height of about 17 mm (0.67 inches) and adjoins the left edge 58B of the interior face 58' of the upper wall 58. The third edge 54C of the upper rounded portion 54 adjoins the first segment 52A. The third edge 54C transitions into a third segment 54D having a radius of about 18 mm (0.71 inches). The second segment 52B of the lower rounded wall portion and the third segment 54D of the upper rounded wall portion provide a transition ramp 56 that feeds into the transition surface 68. The width of the transition ramp 56 gradually increases until it converges with and into the transition surface 68. Additionally, the upper rounded wall portion 54 transitions into the left wall 88 of the discharge channel 82. The lower rounded wall portion 50 and the upper rounded wall portion 54 are shaped to efficiently turn the pressurized air that directly impinges on these portions toward the discharge duct 80. The portion of the chamber 42 formed by the lower and upper rounded wall portions 50, 54 extend laterally outward from the opening into the discharge channel 82 (see, FIG. 2). This configuration provides space for the pressurized air to be turned into the discharge channel 82.

Referring to FIG. 17, the trough 62' having a rounded surface forms a bottom of the chamber 42. The trough 62' includes a first edge 62A, a second edge 62B, a third edge 62C, and a fourth edge 62D. The first edge 62A having a radius of about 5 mm (0.20 inches) adjoins the rounded portion 44D formed between the first segment 44A and the third segment 44C of the interior face 44' of the right end wall. The second edge 62B having a length of about 36 mm (1.42 inches) adjoins the lower edge 58D of the interior face 58' of the upper wall 58. The third edge 62C having a radius of about 5 mm (0.20 inches) adjoins the second edge 50B of the lower rounded wall portion 50. The fourth edge 62D having a length of about 36 mm (1.42 inches) adjoins the lower bound 60C of the interior side 60' of the lower wall. In the illustrated embodiment, the rounded surface of the trough 62', the rounded wall 48, and the upward angling of the interior face 60' of the lower wall, together provide components that facilitate in transitioning the pressurized air from the chamber 42 to the discharge channel 82.

Figure 7:
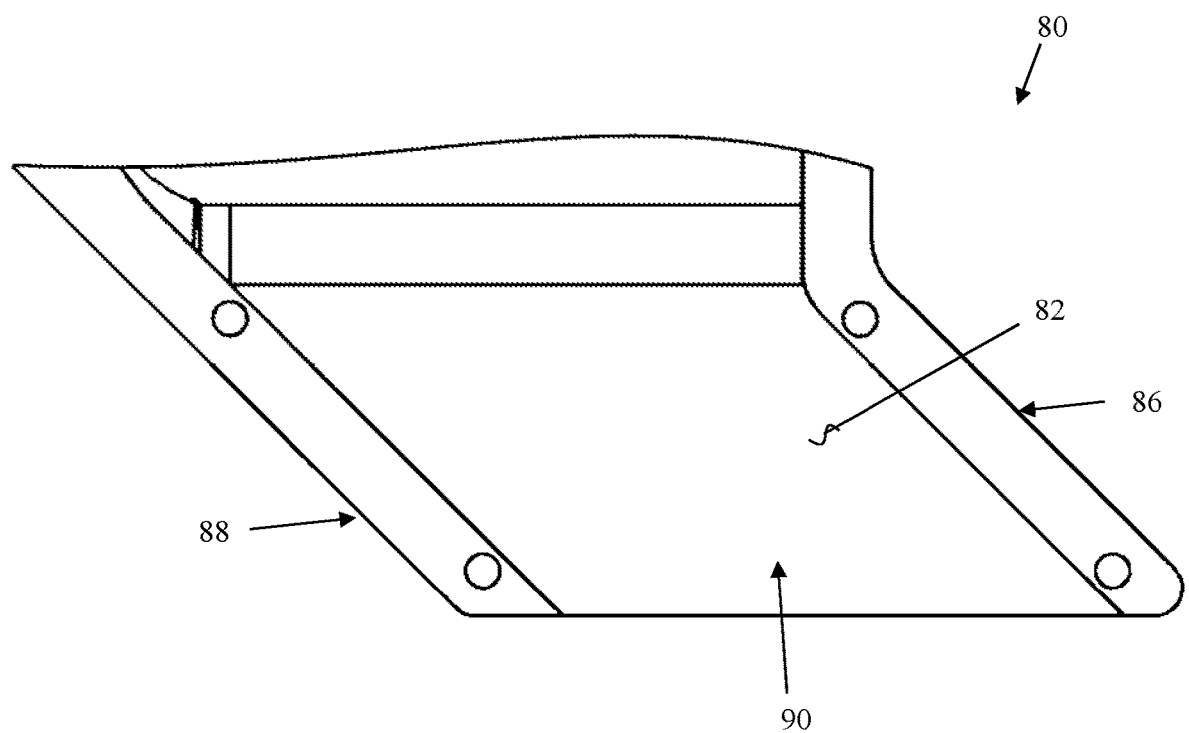
FIG. 7 is an enlarged, fragmentary front elevation of a discharge channel portion of the first housing portion.
Figure 8:
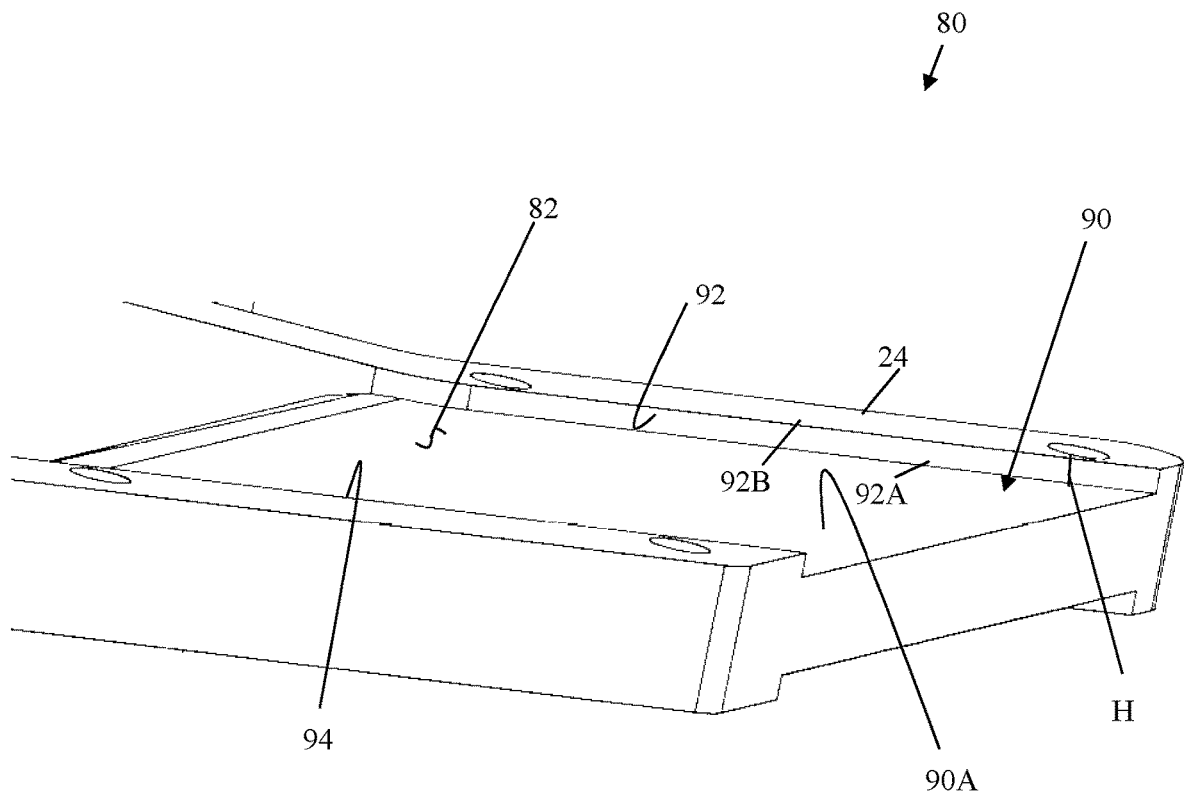
FIG. 8 is a left side perspective of FIG. 7.
Figure 9:
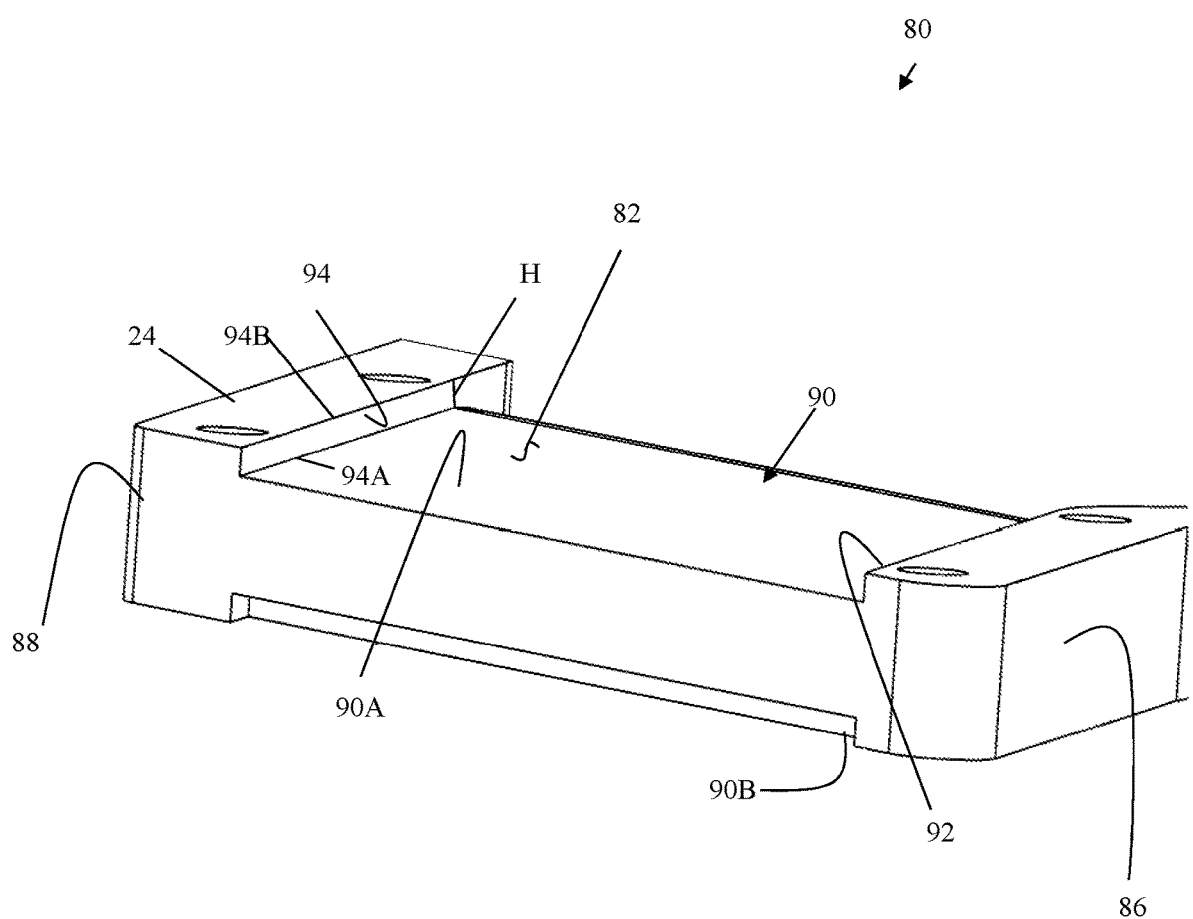
FIG. 9 is a bottom side perspective of FIG. 7.
Figure 10:
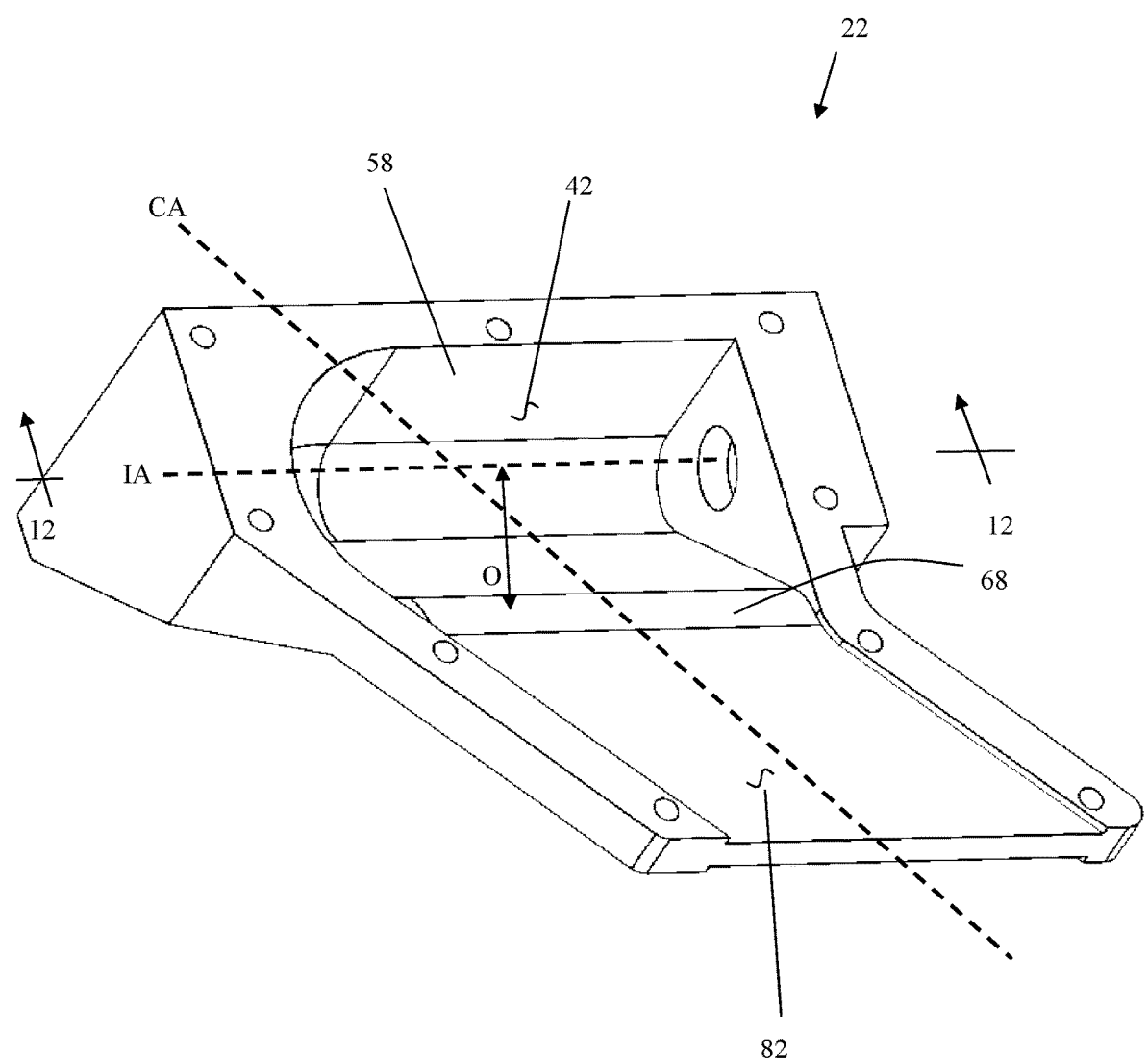
FIG. 10 is a left side perspective of the first housing portion.

Referring to FIGS. 7-9, the discharge channel 82 is defined by the interior faces of the plurality of walls of the discharge duct 80, as described above. The discharge channel 82 is formed from a right (first) shoulder 92 and a left (second) shoulder 94 which together form internal walls of the channel. The planar member 90 is arranged between the right and left shoulders, 92, 94, providing, in part, the discharge channel for the pressurized air to travel, as will be described in further detail below. The planar member 90 includes an interior face 90A and an exterior face 90B opposite the interior face. The right shoulder 92 includes a lower edge 92A and an upper edge 92B, opposite the lower edge. The lower edge 92A forms a first corner with the interior face 90A of the planar member. The upper edge 92B forms a second corner with the front face margin 24. The height H between the first and second corners is about 1 mm (0.04 inches), and defines the height of the discharge channel 82. The left shoulder 94 includes a lower edge 94A and an upper edge 94B, opposite the lower edge. The lower edge 94A of the left shoulder forms a third corner with the interior face 90A of the planar member. The upper edge 94B forms a fourth corner with the front face margin 24. The height H between the third and fourth corners is about 1 mm (0.04 inches). In the illustrated embodiment, the upper edge 94B is about 42 mm (1.65 inches) and the lower edge 94A about 34 mm (1.34 inches) in length. The upper edge 92B and the lower edge 92A of the right shoulder 92 are each about 31 mm (1.22 inches) in length.

Figure 18:
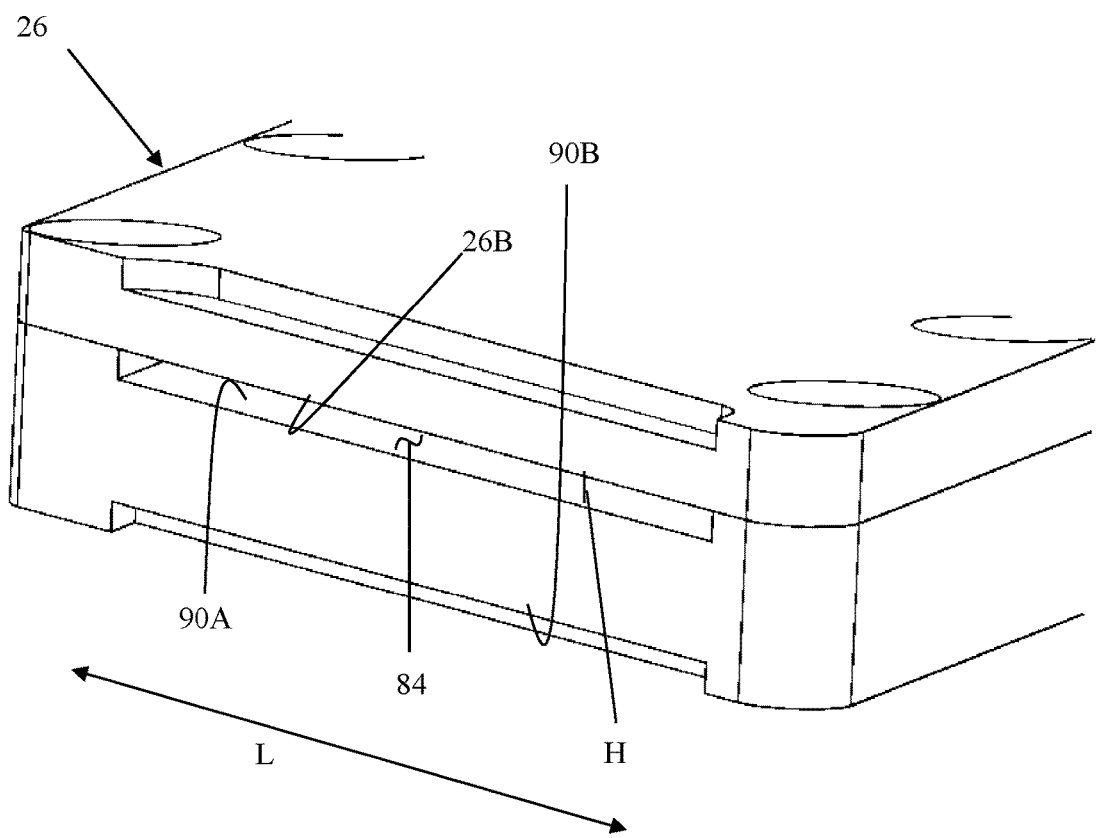
FIG. 18 is a fragmentary perspective of a lower end of a discharge channel portion of the air knife showing an outlet opening.
Figure 19:
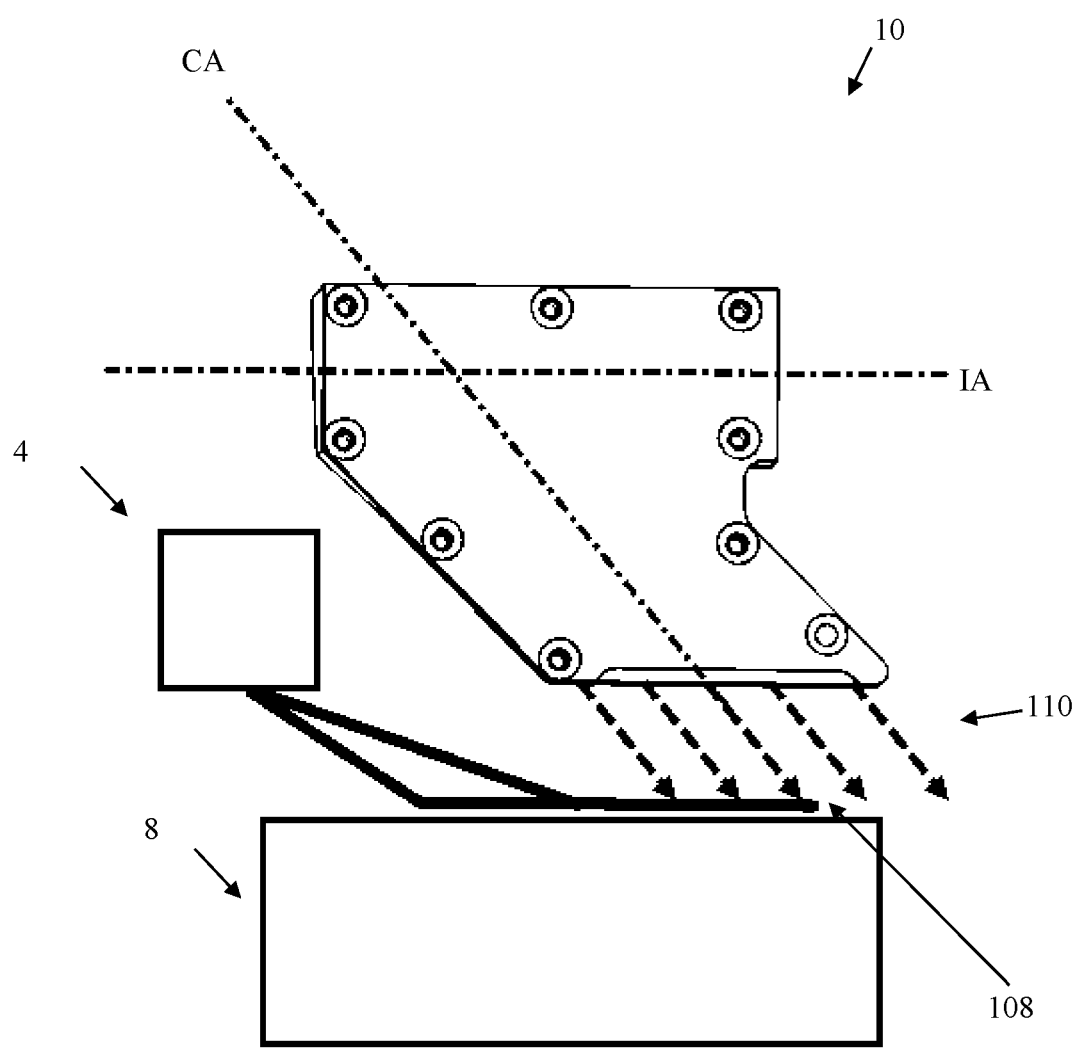
FIG. 19 is a highly idealized schematic of the apparatus of FIG. 1 illustrating a function of the air knife.

Referring to FIG. 18, a section of the housing cover portion 26 fastened to the front face margin 24 illustrates the height of 1 mm between the first and second corners and the third and fourth corners, and thus the height between the interior face 90A of the planar member and the interior face 26B of the cover portion, provides for the outlet opening 84. The outlet opening 84 has a length L of about 40 mm (1.57 inches). Therefore, the outlet opening spans an area of about 40 millimeters squared. As the height H of the opening 84 is greatly smaller than the length L, the discharge channel is shaped to exhaust the pressurized air in a single, unitary, thin and flat stream.

Other sizes and shapes of the chamber can be used without departing from the scope of this disclosure. For example, the chamber may be defined by a generally more rounded shape, rather than the generally triangular shape in the illustrated embodiment. Moreover, a non-planar cover may be provided to form in part a chamber having a larger volume, however maintaining a planar portion configured to form in part the discharge duct.

Referring to FIGS. 23, a highly schematic and exaggerated illustration of using the air knife is shown. In an example of using the air knife, the container 4 holds a volume of molten polymeric material in which a die extrudes the material onto the rotatable chill roll 8. The molten web is highly formable in its current state as it is extruded out onto the chill roll. In the schematic, an edge portion of the web is adjacent an edge portion of the chill roll. The edge portion of the web could be more toward the center of the chill roll 8. In either event, the directional air knife 10 is arranged such that it is angled toward the edge margin 108 of the web. Stream lines 110 illustrate the angle at which the pressurized air impinges the edge margin 108. The length of the stream line is illustrative of the magnitude of pressure being applied to the edge margin 108. It will be appreciated that the pressure (i.e. lengths of the stream lines) is the same across all five stream lines because the outlet opening 84 is spaced a constant distance from the chill roll. It is understood that the angle of the discharge duct, and thus the discharge channel, with respect to the inlet axis allows pressure across the edge margin 108 to be applied equally. Moreover, by angling the flow of air represented by the stream lines 110 outward pas the edge of the web W, the air which impinges upon the chill roll 8 to the side of the edge of the web W, which not be re-directed under the web, but rather will deflect out to the side. In this way, the air does not damage the edge of the web W.

Figure 20:
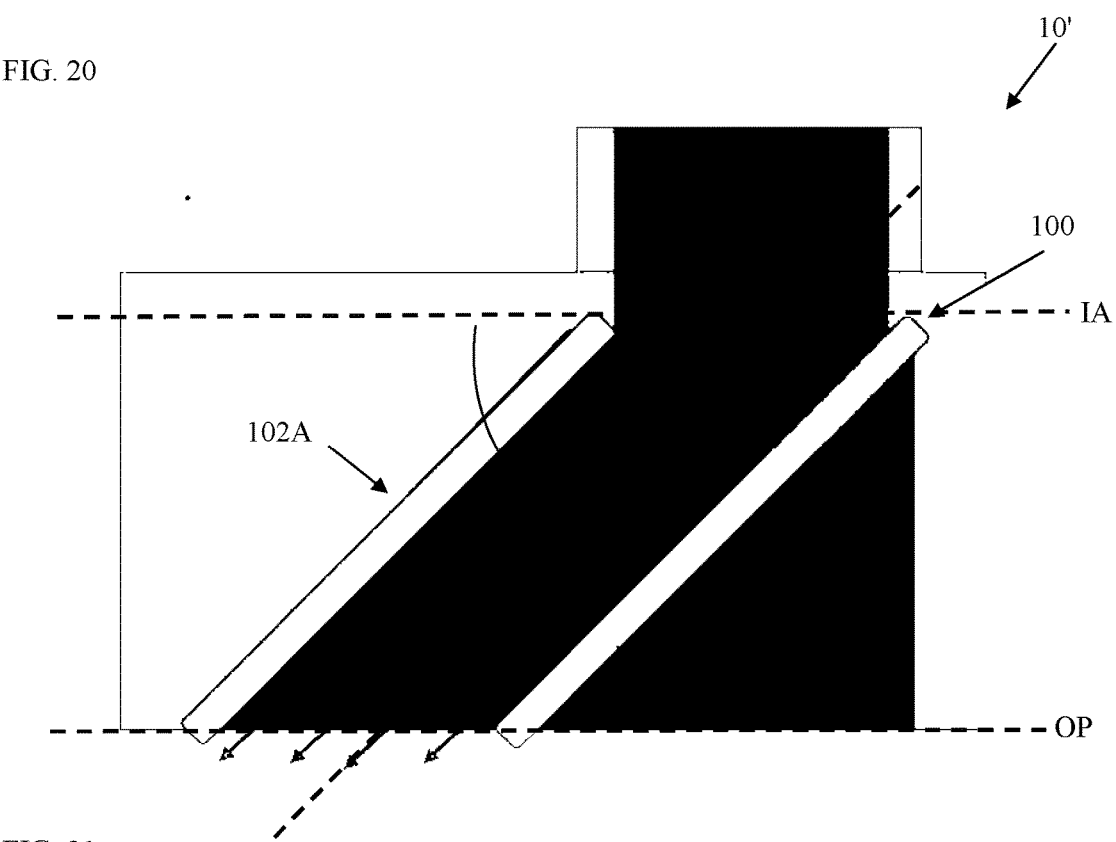
FIG. 20 is a schematic, sectional view of an air knife of another embodiment having adjustable baffling shown at a 45-degree angle with respect to an inlet axis of the inlet portion.
Figure 21:
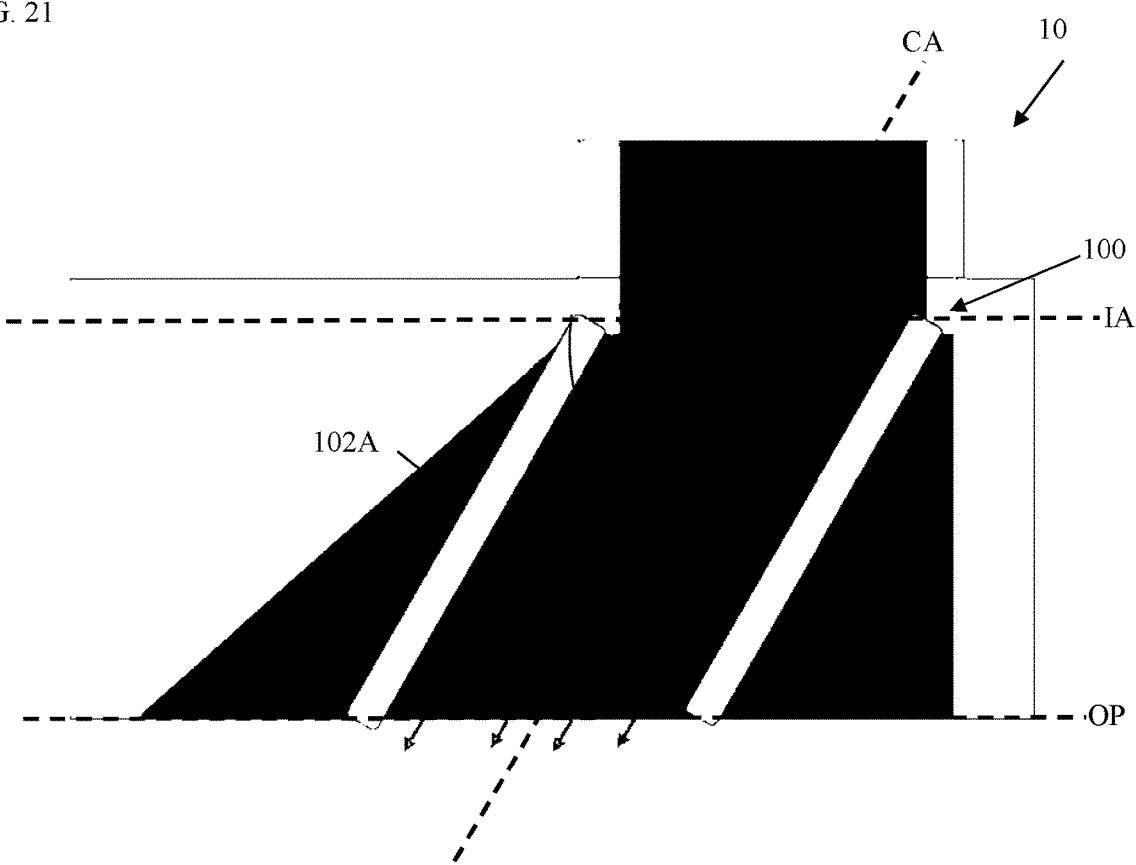
FIG. 21 is the air knife of FIG. 20 shown at a 30-degree angle with respect to an inlet axis of the inlet portion.
Figure 22:
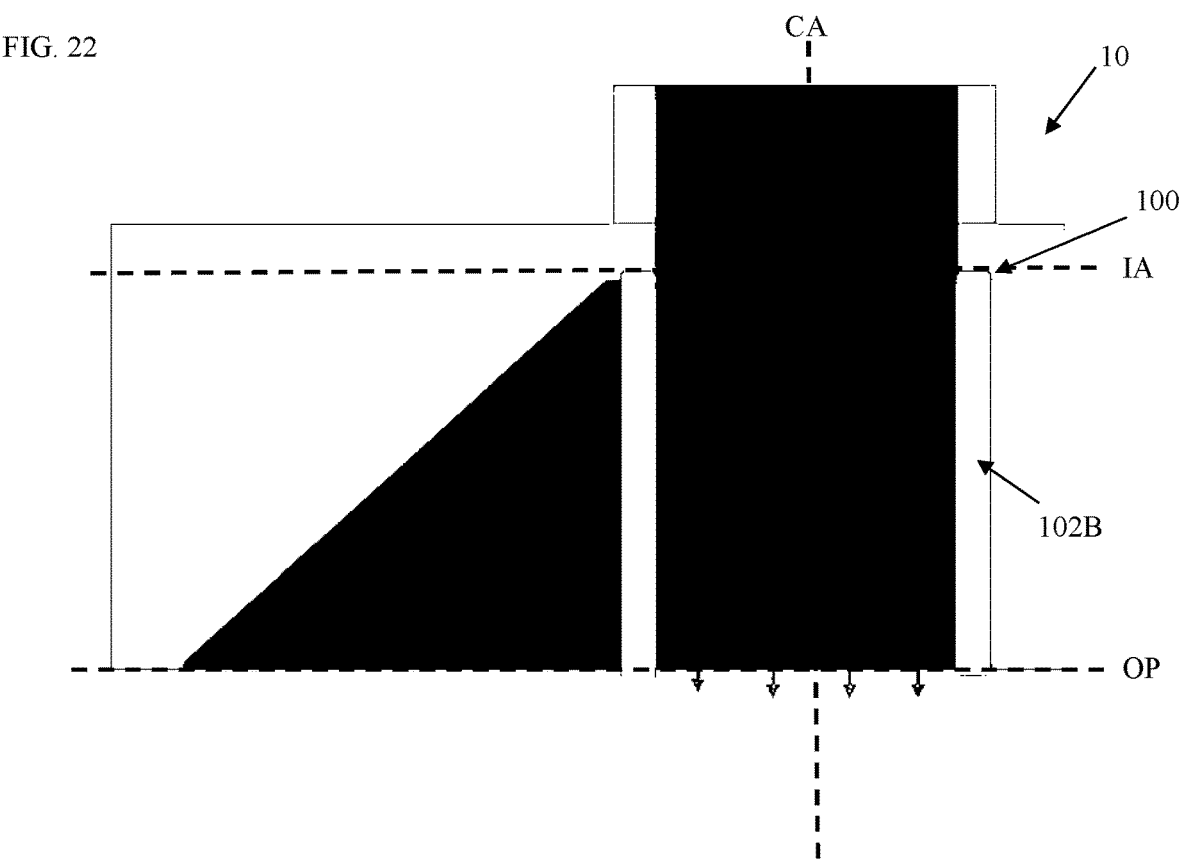
FIG. 22 is the air knife of FIG. 20 shown at a 90-degree angle with respect to an inlet axis of the inlet portion.

Referring to FIGS. 20-22, another embodiment of an air knife 10' may include an internal baffle 100 for selectively changing an angle α at which pressurized air is exhausted from the air knife. The baffle 100 includes a pair of diverter vanes 102A, 102B mounted on the housing for movement relative to the housing to change the angle α. The baffle 100 permits the operator to selectively change the exit angle of the pressurized air. The operator may selectively adjust the diverter vanes 102A, 102B to discharge air at any angle ranging between 30-degrees and 90-degrees, with respect to the inlet axis. The inventors have found desirable a discharge angle ranging between 45-degrees and 60-degrees. Tick marks (not shown) in 5-degree increments are inscribed on the housing 20 to assist the operator in selectively adjusting the diverter vanes 102A, 102B to the desired angle. Notably, the baffle permits the outlet plane (OP) to remain parallel with the inlet axis (IA) and the surface of the chill roll (not shown), which allows in part for the elongate stream of pressurized air to exit the air knife 10 in a manner as described above.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A directional air knife for use in applying air to an edge of a film as the film is being formed, the directional air knife comprising a housing including an inlet opening for receiving air under pressure into the housing along a first inlet axis, a chamber defined within the housing and positioned to receive air passing through the inlet opening along the first inlet axis, a discharge duct defined by the housing and including a discharge channel within the discharge duct in fluid communication with the chamber for receiving the air under pressure and an outlet opening through which the air under pressure passes out of the discharge duct, the discharge channel having a second central axis along which the air under pressure flows to the outlet opening and out of the housing, the second central axis being arranged with respect to the first inlet axis at an angle that is neither parallel with nor at right angles to the first inlet axis.

2. The directional air knife as set forth in claim 1, wherein the outlet opening lies in a plane parallel to the first inlet axis.

3. The directional air knife as set forth in claim 2, wherein the housing includes first and second internal walls defining opposite sides of the discharge channel, the first and second internal walls each making an angle that is neither parallel with nor at right angles to the first inlet axis.

4. The directional air knife as set forth in claim 3, wherein the housing includes an inlet portion containing the chamber, the inlet portion of the housing having laterally opposite end surfaces, the discharge duct projecting laterally outward from a projection of one of the opposite end surfaces of the inlet portion of the housing.

5. The directional air knife as set forth in claim 4, wherein the outlet opening is elongate in a direction between the first and second internal walls.

6. The directional air knife as set forth in claim 1, wherein the discharge channel opens into the chamber along a side of the chamber.

7. The directional air knife as set forth in claim 6, wherein the discharge channel opens into the chamber at a location offset laterally from the inlet opening.

8. The directional air knife as set forth in claim 1, wherein the chamber is defined in part by a rounded internal wall of the housing opposite the inlet opening.

9. The directional air knife as set forth in claim 8, wherein a portion of the rounded wall transitions smoothly into an internal wall of the housing forming a side of the discharge channel.

10. The directional air knife as set forth in claim 1, further comprising a baffle mounted on the housing and at least partially located in the discharge channel, the baffle being movable with respect to the housing for changing the direction of flow of the air under pressure passing through the discharge channel to the outlet opening.

11. A directional air knife for use in applying air to an edge of a film as the film is being formed, the directional air knife comprising a housing including an inlet opening for receiving air under pressure into the housing, a chamber defined within the housing and positioned to receive air passing through the inlet opening, a discharge duct defined by the housing and including a discharge channel within the discharge duct in fluid communication with the chamber for receiving the air under pressure and an outlet opening through which the air under pressure passes out of the discharge duct, the housing including an inlet portion containing the chamber, the discharge duct extending from the inlet portion, the inlet portion of the housing having laterally opposite end surfaces, the discharge duct projecting laterally outward from a projection of one of the opposite end surfaces of the inlet portion of the housing, a first of the end surfaces being located opposite of the inlet opening, the first end surface being curved to an intersection with the discharge duct.

12. The directional air knife as set forth in claim 11, wherein the discharge duct is free of any portion projecting laterally outward from a projection of the other of the opposite end surfaces of the inlet portion of the housing.

13. The directional air knife as set forth in claim 12, wherein the opposite end surfaces of the inlet portion of the housing intersect respective end surface planes, the end surface planes being parallel to each other and generally perpendicular to an inlet axis passing through the inlet opening, the discharge duct intersecting one of the end surface planes, but not the other of the end surface planes.

14. The directional air knife as set forth in claim 11, wherein the outlet opening lies in a plane parallel to the inlet axis.

15. The directional air knife as set forth in claim 14, wherein the housing includes first and second internal walls defining opposite sides of the discharge channel, the first and second internal walls each making an angle that is neither parallel with nor at right angles to the inlet axis.

16. The directional air knife as set forth in claim 15, wherein the outlet opening is elongate in a direction between the first and second internal walls.

17. The directional air knife as set forth in claim 11, wherein the discharge channel opens into the chamber along a side of the chamber.

18. The directional air knife as set forth in claim 17, wherein the discharge channel opens into the chamber at a location offset laterally from the inlet opening.

19. The directional air knife as set forth in claim 11, wherein the chamber is defined in part by a rounded internal wall of the housing opposite the inlet opening.

20. The directional air knife as set forth in claim 19, wherein a portion of the rounded wall transitions smoothly into an internal wall of the housing forming a side of the discharge channel.

* * * * *